United States Patent
Hatanaka et al.

(10) Patent No.: US 10,082,887 B2
(45) Date of Patent: *Sep. 25, 2018

(54) INPUT DEVICE INCLUDING A STABILIZING FORCE

(71) Applicant: DENSO CORPORATION, Kariya, Aichi-pref. (JP)

(72) Inventors: Shinji Hatanaka, Kariya (JP); Motoki Tachiiri, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,321

(22) PCT Filed: Feb. 8, 2016

(86) PCT No.: PCT/JP2016/000634
§ 371 (c)(1),
(2) Date: Jun. 16, 2017

(87) PCT Pub. No.: WO2016/139892
PCT Pub. Date: Sep. 9, 2016

(65) Prior Publication Data
US 2018/0004315 A1 Jan. 4, 2018

(30) Foreign Application Priority Data

Mar. 3, 2015 (JP) ................................. 2015-041633
May 26, 2015 (JP) ................................. 2015-106736

(51) Int. Cl.
*G06F 3/0354* (2013.01)
*G06F 3/01* (2006.01)

(52) U.S. Cl.
CPC ............ *G06F 3/0354* (2013.01); *G06F 3/016* (2013.01)

(58) Field of Classification Search
CPC ......... G06F 3/016; G06F 3/0354; G06F 3/038
See application file for complete search history.

(56) References Cited

U.S. PATENT DOCUMENTS 9,646,787 B2 * 5/2017 Hatanaka ............... H01H 36/02
2004/0056745 A1 * 3/2004 Watanabe ............... G06F 3/016
335/220

(Continued)

FOREIGN PATENT DOCUMENTS

| JP | 2004112979 A | 4/2004 |
| JP | 2014217176 A | 11/2014 |
| JP | 2015125552 A | 7/2015 |

*Primary Examiner* — Chun-Nan Lin
(74) *Attorney, Agent, or Firm* — Harness, Dickey & Pierce, P.L.C.

(57) ABSTRACT

An input device includes: an input portion; a supporting portion supporting the input portion; a first actuator having a first magnetic pole forming portion and a first coil; a second actuator having a second magnetic pole forming portion and a second coil; and a fixed yoke and a movable yoke forming a magnetic circuit for magnetic fluxes generated by the first and second magnetic pole forming portions. One of the fixed yoke and the movable yoke has a magnetic resistance as resistance in the magnetic circuit. A stabilizing force is generated in the movable yoke to stabilize the magnetic circuit against the magnetic resistance. The magnetic resistance is located such that an acting direction of the stabilizing force is opposite to a fall direction of the movable yoke due to own weight in accordance with an inclined installation.

9 Claims, 15 Drawing Sheets

(56) References Cited

U.S. PATENT DOCUMENTS

| | | | |
|---|---|---|---|
| 2004/0059245 A1 | 3/2004 | Watanabe et al. | |
| 2011/0140818 A1* | 6/2011 | Hatanaka | G05G 5/05 335/219 |
| 2016/0077590 A1* | 3/2016 | Tachiiri | G06F 3/0354 345/184 |
| 2016/0195937 A1* | 7/2016 | Tachiiri | G06F 3/0338 345/157 |
| 2016/0328018 A1* | 11/2016 | Hisatsugu | G06F 3/016 |
| 2017/0032915 A1 | 2/2017 | Hatanaka et al. | |

* cited by examiner

FORCE TO INCREASE MAGNETIC FLUX LEAKAGE     FORCE TO INCREASE MAGNETIC FLUX LEAKAGE

FORCE TO INCREASE MAGNETIC FLUX LEAKAGE     MAGNETIC FLUX LEAKAGE IS NOT INCREASED ⇒ NO FORCE ACTING (a)

$F1+F2 > F \Rightarrow F2 > F-F1$ (b)

$F2 < F+F3$

INPUT DEVICE INCLUDING A STABILIZING FORCE

CROSS REFERENCE TO RELATED APPLICATIONS

This application is a U.S. National Phase Application under 35 U.S.C. 371 of International Application No. PCT/JP2016/000634 filed on Feb. 8, 2016 and published in Japanese as WO 2016/139892 A1 on Sep. 9, 2016. This application is based on and claims the benefit of priority from Japanese Patent Application No. 2015-41633 filed on Mar. 3, 2015 and Japanese Patent Application No. 2015-106736 filed on May 26, 2015. The entire disclosures of all of the above applications are incorporated herein by reference.

TECHNICAL FIELD

The present disclosure relates to an input device.

BACKGROUND ART

An input device (actuator) disclosed in Patent Literature 1 includes a first yoke plate of a flat plate shape disposed horizontally, a second yoke plate of a flat plate shape disposed oppositely parallel to the first yoke plate, multiple magnets fixed to a surface of the first yoke plate on a side of the second yoke plate, and multiple coils provided in a movable manner between the multiple magnets and the second yoke plate. A tactile rendering member is connected to a coil fixing member fixing the multiple coils all together.

Patent Literature 1 describes that when a current is passed through the multiple coils, an electromagnetic force is generated in the multiple coils due to the current and magnetic fluxes generated by the multiple magnets. The electromagnetic force is transmitted to the coil fixing member and the tactile rendering member to render a tactile sensation for example, at a fingertip of an operator touching the tactile rendering member.

PRIOR ART LITERATURES

Patent Literature

Patent Literature 1: JP 2004-112979 A

SUMMARY OF INVENTION

In a case where the yoke plates cannot be disposed horizontally and need to be inclined when the input device described in Patent Literature 1 is installed to a predetermined portion, a downward force acts on the tactile rendering member along a plate surface direction of the yoke plates due to own weights of the tactile rendering member and the coil fixing member. In such a case, the tactile rendering member is moved to a lower side by the downward force. In addition, because the downward force is added, an operation feeling becomes different between an upward operation and a downward operation and the operator has a feeling of strangeness.

An object of the present disclosure is to provide an input device capable of restricting an influence of a downward force due to own weight even when installed with an inclination.

According to an aspect of the present disclosure, an input device includes:

an input portion in which an operation force is inputted in a direction parallel to a virtual operation plane;

a supporting portion supporting the input portion in a movable manner along the operation plane in response to an input of the operation force;

a first actuator having a first magnetic pole forming portion forming a magnetic pole and a first coil through which a magnetic flux generated by the first magnetic pole forming portion passes, and letting an electromagnetic force generated by application of a current to the first coil act on the input portion as an operation reaction force in a first direction parallel to the operation plane;

a second actuator having a second magnetic pole forming portion forming a magnetic pole and a second coil through which a magnetic flux generated by the second magnetic pole forming portion passes, and letting an electromagnetic force generated by application of a current to the second coil act on the input portion as an operation reaction force in a second direction parallel to the operation plane and intersecting with the first direction; and a fixed yoke and a movable yoke disposed to sandwich the first magnetic pole forming portion and the second magnetic pole forming portion and forming a magnetic circuit for magnetic fluxes generated by the first and second magnetic pole forming portions.

The first and second actuators are arranged in an inclined installation, in which one of the first and second actuators is located on a lower side of the other, and one of the fixed yoke and the movable yoke has a magnetic resistance as resistance in the magnetic circuit.

A stabilizing force is generated in the movable yoke to stabilize the magnetic circuit against the magnetic resistance, and the magnetic resistance is located such that an acting direction of the stabilizing force is opposite to an own weight fall direction of the movable yoke in accordance with the inclined installation.

Generally, a force (stabilizing force) acts in the magnetic circuit in a direction to reduce resistance across a magnetic path about the respective magnetic pole forming portions via the fixed yoke and the movable yoke. Resistance across a magnetic path decreases as an area of the magnetic path increases. Hence, an acting force (stabilizing force) is generated in a direction to increase an area of the magnetic path, that is, to increase magnetic flux leakage.

The presence of magnetic resistance makes an acting direction of the stabilizing force opposite to a fall direction under own weight of the movable yoke in the inclined installation, that is, upward. The upward force can counteract a downward force generated due to own weight when an input device is installed with an inclination. Hence, even when the input device is installed with an inclination, an influence of a downward force due to own weight can be restricted.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
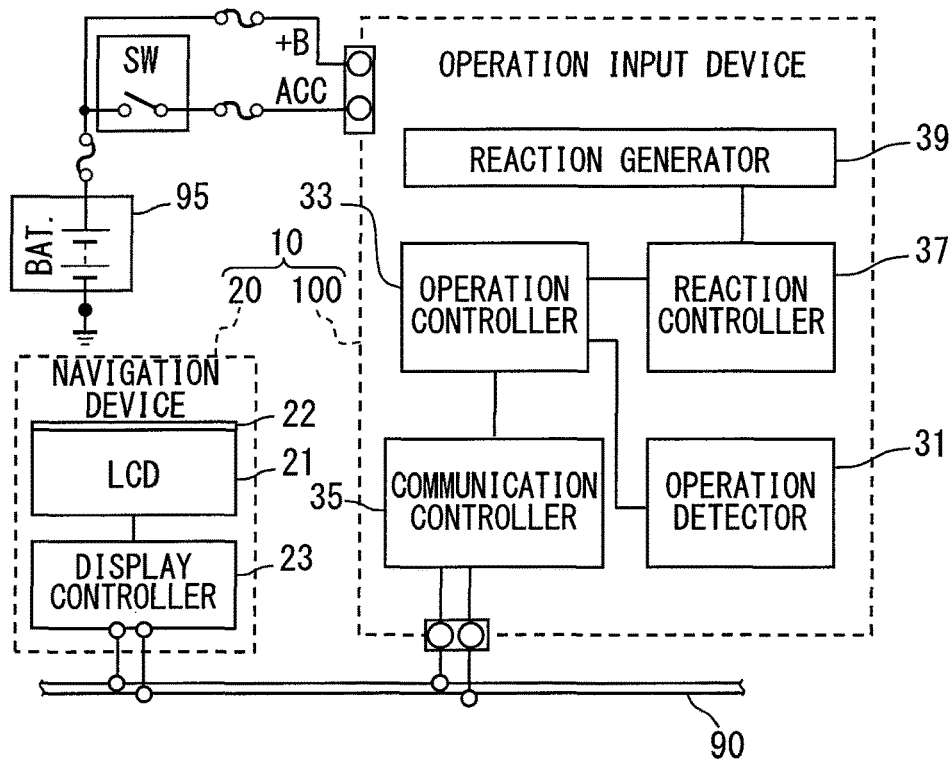
FIG. 1 is a view describing a configuration of a display system including an operation input device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination. It is assumed that the following explanation discloses combinations of components of the embodiments and the modifications not explicitly described.

First Embodiment

Figure 2:
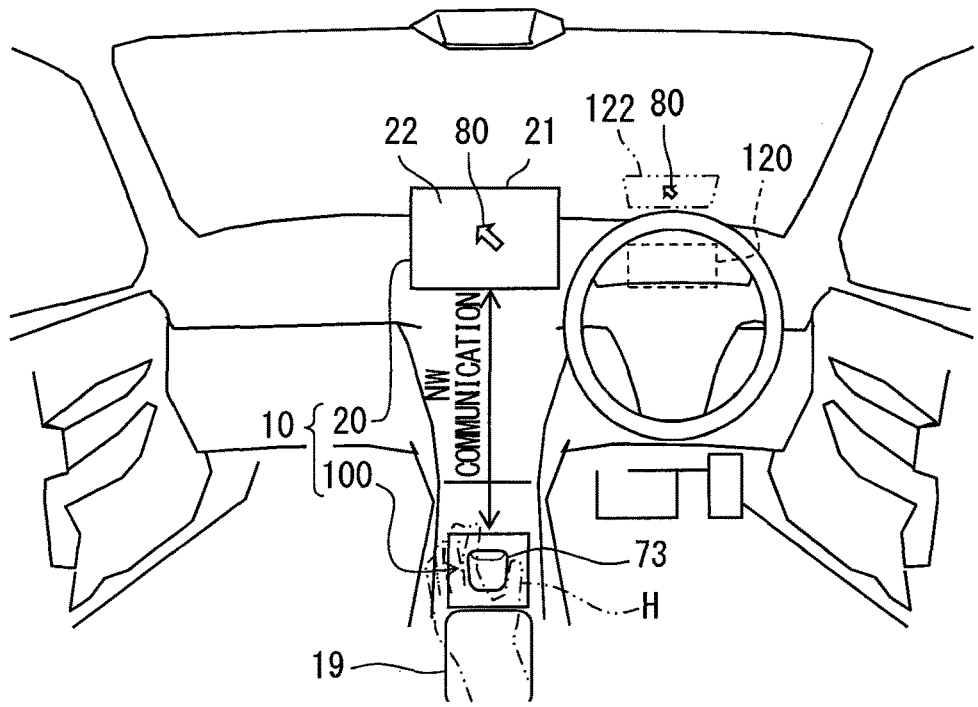
FIG. 2 is a view describing a location of the operation input device in a cabin.

An operation input device 100 of a first embodiment shown in FIG. 1 is installed to a vehicle and forms a display system 10 with a display such as a navigation device 20 or a head-up display device 120 (see FIG. 2) in a cabin. As shown in FIG. 2, the operation input device 100 is provided to a center console of the vehicle at a location next to a palm rest 19 and has an operation knob 73 which is exposed within a range easy to access by an operator. Upon input of an operation force by a hand H or the like of the operator, the operation knob 73 undergoes displacement in a direction of the input operation force.

Figure 3:
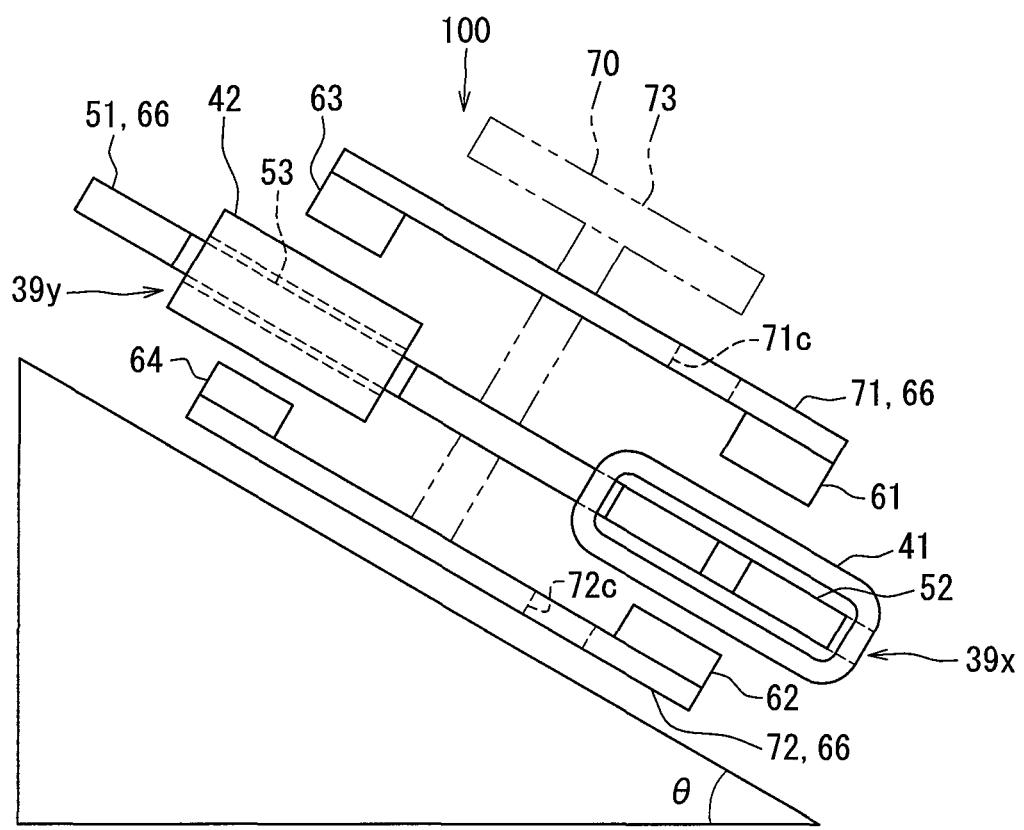
FIG. 3 is a view describing a posture of the operation input device when installed.

As shown in FIG. 3, the operation input device 100 is installed with inclination at an inclined angle θ with one of a first voice coil motor 39x and a second voice coil motor 39y described below on a lower side with respect to the other. Herein, one of the voice coil motors is the first voice coil motor 39x and the other voice coil motor is the second voice coil motor 39y.

The navigation device 20 is provided within an instrument panel of the vehicle and has a display screen 22 which is exposed toward a driver's seat. The display screen 22 displays multiple icons correlated with preliminarily assigned functions, a pointer 80 used to select a desired icon, and so on. When an operation force in a horizontal direction is inputted into the operation knob 73, the pointer 80 moves across the display screen 22 in a direction corresponding to an input direction of the operation force. As shown in FIG. 1 and FIG. 2, the navigation device 20 is connected to a communication bus 90 and capable of making a network communication with the operation input device 100 and so on. The navigation device 20 has a display controller 23 which creates an image to be displayed on the display screen 22 and a liquid crystal display 21 which displays a series of images created by the display controller 23 on the display screen 22.

Respective configurations of the operation input device 100 as above will now be described more in detail. As shown in FIG. 1, the operation input device 100 is connected to the communication bus 90, an external battery 95, and so on. The operation input device 100 is capable of communicating with the navigation device 20 at a remote location through the communication bus 90. The operation input device 100 is supplied with power necessary for operations of the respective configurations from the battery 95.

The operation input device 100 is electrically made up of a communication controller 35, an operation detector 31, a reaction force generator 39, a reaction force controller 37, an operation controller 33, and so on.

The communication controller 35 outputs information processed in the operation controller 33 to the communication bus 90. The communication controller 35 also acquires information outputted from other in-vehicle devices to the communication bus 90 and outputs the acquired information to the operation controller 33.

The operation detector 31 detects a position of the operation knob 73 (see FIG. 2) which has been moved by an input of an operation force. The operation detector 31 outputs operation information specifying the detected position of the operation knob 73 to the operation controller 33.

The reaction force generator 39 is a configuration which generates an operation reaction force at the operation knob 73 and includes an actuator, such as a voice coil motor. For example, when the pointer 80 (see FIG. 2) is placed on an icon on the display screen 22, the reaction force generator 39 applies an operation reaction force to the operation knob 73 (see FIG. 2) by means of so-called reaction force feedback for the operator to feel a simulated tactile sensation of the icon.

The reaction force controller 37 includes a microcomputer performing, for example, various computations, and so on. The reaction controller 37 controls a direction and a strength of an operation reaction force to be applied to the operation knob 73 by the reaction force generator 39 according to reaction force information acquired from the operation controller 33.

The operation controller 33 includes a microcomputer performing, for example, various computations, and so on. The operation controller 33 acquires operation information detected by the operation detector 31 and outputs the acquired operation information to the communication bus 90 through the communication controller 35. In addition, the operation controller 33 computes a direction and a strength of an operation reaction force to be applied to the operation knob 73 (see FIG. 2) and outputs a computation result to the reaction force controller 37 as reaction force information.

Figure 4:
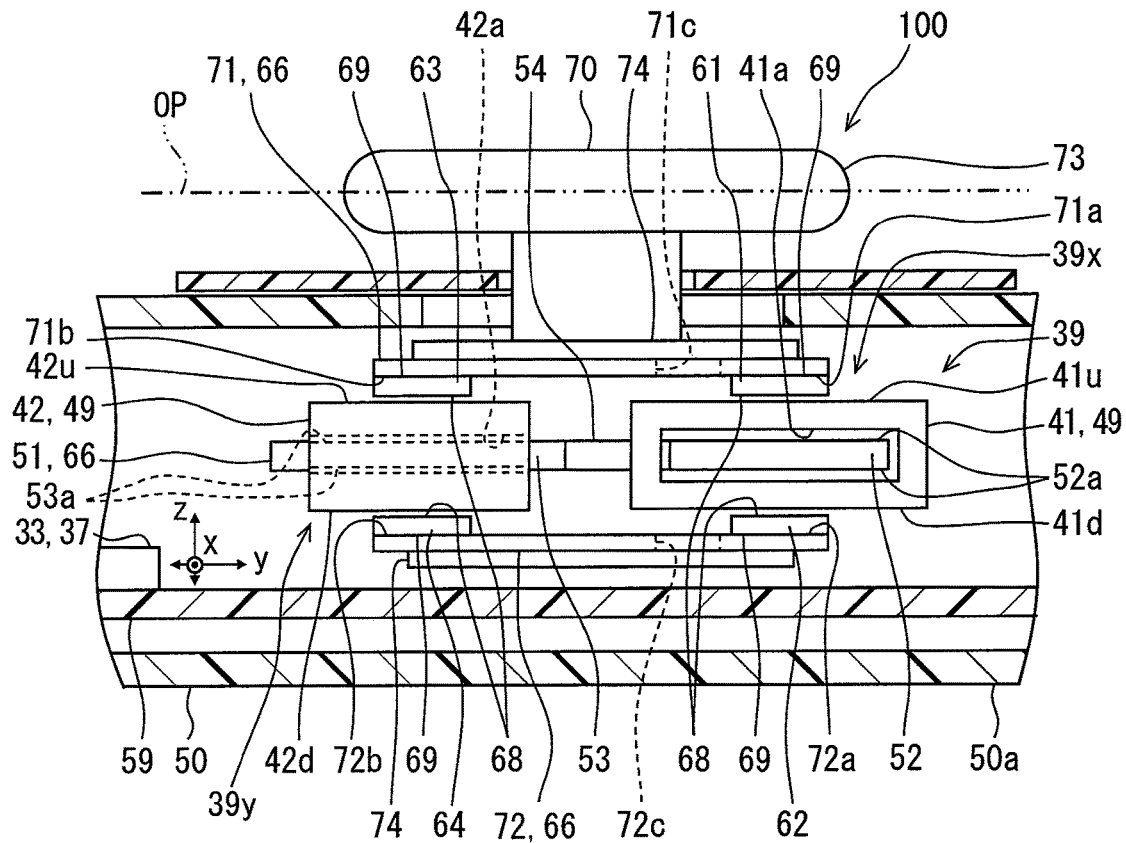
FIG. 4 is a sectional view describing a mechanical configuration of the operation input device.
Figure 5:
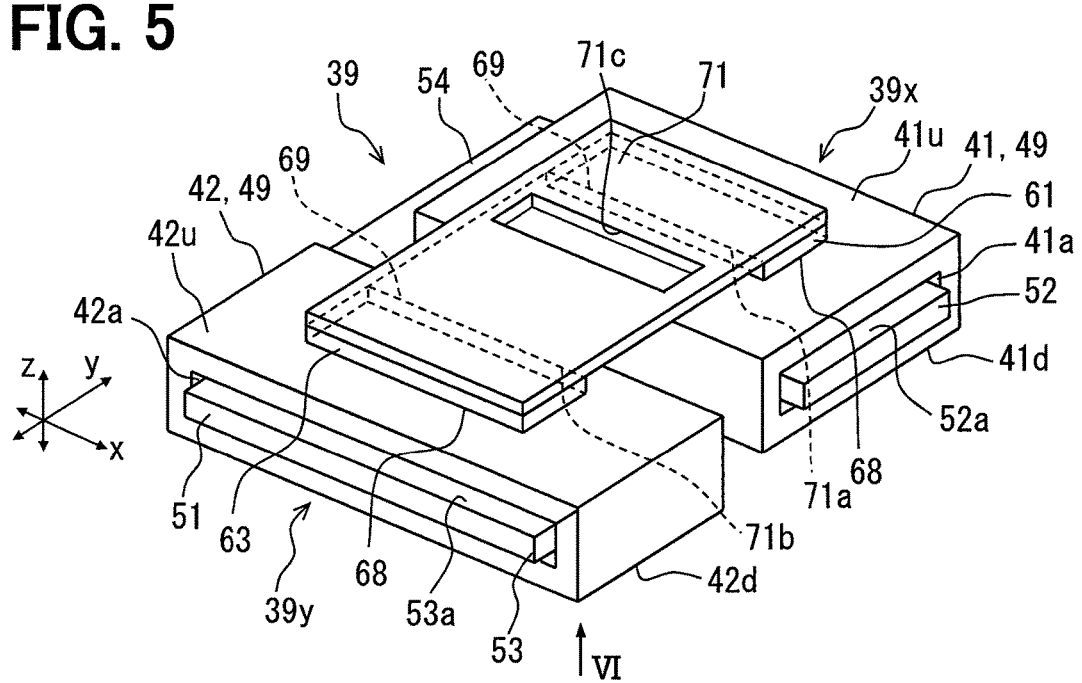
FIG. 5 is a perspective view of a reaction force generator.
Figure 6:
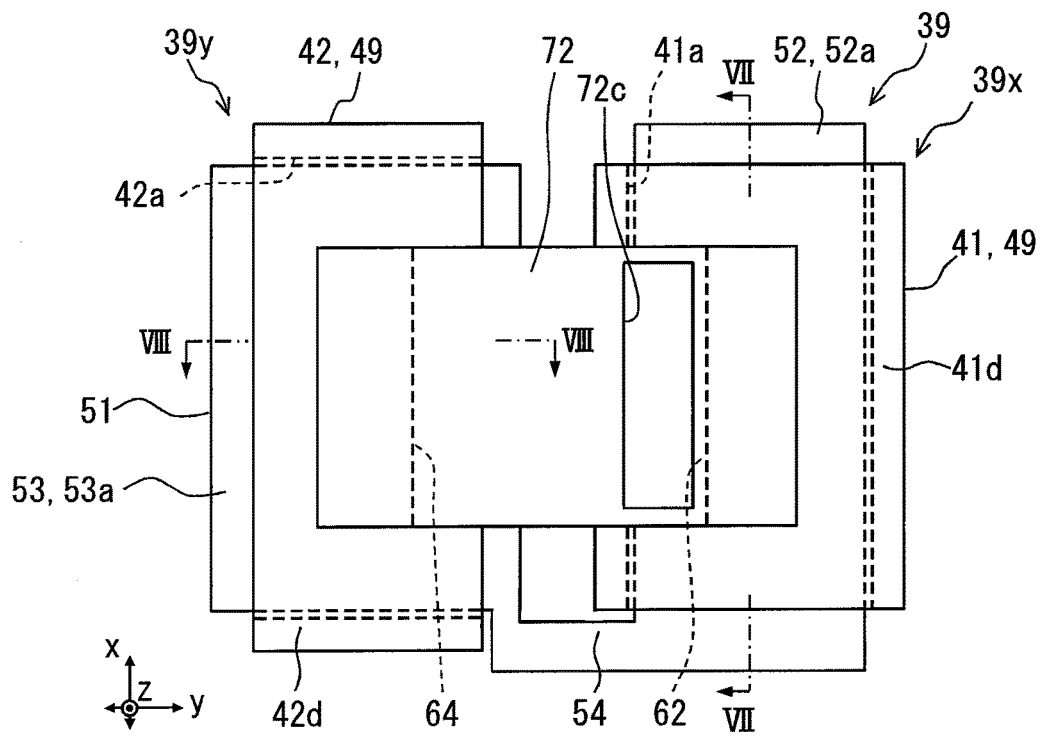
FIG. 6 is a bottom view of the reaction force generator when viewed in a direction indicated by an arrow VI of FIG. 5.

As shown in FIG. 3 and FIG. 4, the operation input device 100 is mechanically made up of a movable portion 70, a fixed portion 50, and so on.

The movable portion 70 has a knob base 74 holding a pair of movable yokes 71 and 72 described below and the operation knob 73 described above. The movable portion 70 is provided to be relatively movable with respect to the fixed portion 50 in an x-axis direction and a y-axis direction both parallel to a virtual operation plane OP. A movable range of the movable portion 70 in each of the x-axis direction and the y-axis direction is predetermined by the fixed portion 50. The movable portion 70 returns to a default position used as a reference when released from an applied operation force.

The fixed portion 50 has a housing 50a and a circuit board 59 and holds a fixed yoke 51 described below. The housing 50a stores respective configurations, such as the circuit board 59 and the reaction force generator 39, while supporting the movable portion 70 in a relatively movable manner. The circuit board 59 is fixed inside the housing 50a while keeping a plane direction of a plate surface parallel to the operation plane OP. Microcomputers forming the operation controller 33, the reaction force controller 37, and so on are mounted to the circuit board 59.

The reaction force generator 39 shown in FIG. 3 through FIG. 6 performs reaction force feedback between the movable portion 70 and the fixed portion 50 described above. The reaction force generator 39 includes the first voice coil motor (hereinafter, abbreviated to VCM) 39x and the second VCM 39y each functioning as an actuator, the fixed yoke 51, the two movable yokes 71 and 72, and so on. The first VCM 39x has a first coil 41 and two magnets 61 and 62. The second VCM 39y has a second coil 42 and two magnets 63 and 64. The following will describe the coils 41 and 42, the magnets 61 through 64, the fixed yoke 51, and the movable yokes 71 and 72 one by one in detail.

Each of the coils 41 and 42 is formed of a coiled wire 49 which is a wire made of a non-magnetic material, such as copper, coiled in a shape of a flat tube. In each of the coils 41 and 42, a traverse section perpendicular to a coil-winding axial direction of the coiled wire 49 is formed in an oblong shape. The coiled wires 49 are coiled until a tube wall of the corresponding coils 41 and 42 becomes, for example, about 3-mm-thick. Storage chambers 41a and 42a each extending in the coil-winding axial direction are provided to the coils 41 and 42, respectively, on an inner peripheral side of the corresponding coiled wires 49. Each of the coils 41 and 42 is electrically connected to the reaction force controller 37 via a wiring pattern provided to the circuit board 59 and a current is applied individually to the two coiled wires 49 by the reaction controller 37.

The coils 41 and 42 are aligned side by side along the y-axis while leaving a slight clearance in between. Each of the coils 41 and 42 is fixed to the fixed portion 50 such as the circuit board 59 while keeping the coil-winding axial direction of the coiled wire 49 parallel to the operation plane OP. The coil-winding axial direction of one coil (hereinafter, referred to as the first coil) 41 is parallel to the x-axis whereas the coil-winding axial direction of the other coil (hereinafter, referred to as the second coil) 42 is parallel to the y-axis. The coils 41 and 42 respectively form a pair of coil side surfaces 41u and 41d and a pair of coil side surfaces 42u and 42d parallel to the operation plane OP. Herein, side surfaces of the respective coils 41 and 42 facing the operation knob 73 are given as upper coil side surfaces 41u and 42u and the other side surfaces facing the circuit board 59 are given as lower coil side surfaces 41d and 42d. Each of the coil side surfaces 41u, 41d, 42u and 42d is formed in substantially a quadrilateral shape having four sides parallel to either the x-axis or the y-axis.

Each of the magnets 61 through 64 is a neodymium magnet or the like and formed in substantially a quadrilateral plate shape having a longitudinal direction. The two magnets 61 and 62 are spaced apart from each other in a z-axis direction substantially perpendicular to the operation plane OP and aligned side by side in the z-axis direction. Likewise, the other two magnets 63 and 64 are spaced apart from each other in the z-axis direction and aligned side by side in the z-axis direction. Each of the magnets 61 through 64 is provided with a magnetized surface 68 and a mounting surface 69 in the form of smooth planes. Magnetic poles of the magnetized surface 68 and the mounting surface 69 provided to the respective magnets 61 through 64 are different from each other (see also FIG. 7 and FIG. 8).

The respective mounting surfaces 69 of the two magnets 61 and 63 are mounted to the movable yoke 71 while keeping long sides parallel to the x-axis. The movable yoke 71 is a member forming a single flat plate, in which regions corresponding to the respective magnets 61 and 63 are connected.

The magnetized surface 68 of the magnet 61 held by the movable yoke 71 opposes the upper coil side surface 41u of the first coil 41 at a predetermined interval in the z-axis direction. The magnetized surface 68 of the magnet 63 held by the movable yoke 71 opposes the upper coil side surface 42u of the second coil 42 at a predetermined interval in the z-axis direction.

The respective mounting surfaces 69 of the other two magnets 62 and 64 are mounted to the movable yoke 72 while keeping long sides parallel to the x-axis. As with the movable yoke 71, the movable yoke 72 is a member forming a single flat plate, in which regions corresponding to the respective magnets 62 and 64 are connected.

The magnetized surface 68 of the magnet 62 held by the movable yoke 72 opposes the lower coil side surface 41d of the first coil 41 at a predetermined interval in the z-axis direction. The magnetized surface 68 of the magnet 64 held by the movable yoke 72 opposes the lower coil side surface 42d of the second coil 42 at a predetermined interval in the z-axis direction.

The magnetized surfaces 68 of the respective magnets 61 through 64 oppose the corresponding coil side surfaces 41u, 41d, 42u, and 42d at center positions when the movable portion 70 is back at the default position.

According to the configuration described above, as shown in FIG. 7, magnetic fluxes generated by the respective magnets 61 and 62 pass through (penetrate through) the coiled wire 49 of the first coil 41 in the z-axis direction. Hence, when charges migrate inside the coiled wire 49 placed in a magnetic field due to application of a current to the first coil 41, a Lorentz force is developed in each charge. Accordingly, the first VCM 39x produces electromagnetic forces EMF_x in the x-axis direction (first direction) between the first coil 41 and the respective magnets 61 and 62. By inverting a direction of a current applied to the first coil 41, produced electromagnetic forces EMF_x are also inverted to an opposite direction along the x-axis.

Figure 8:
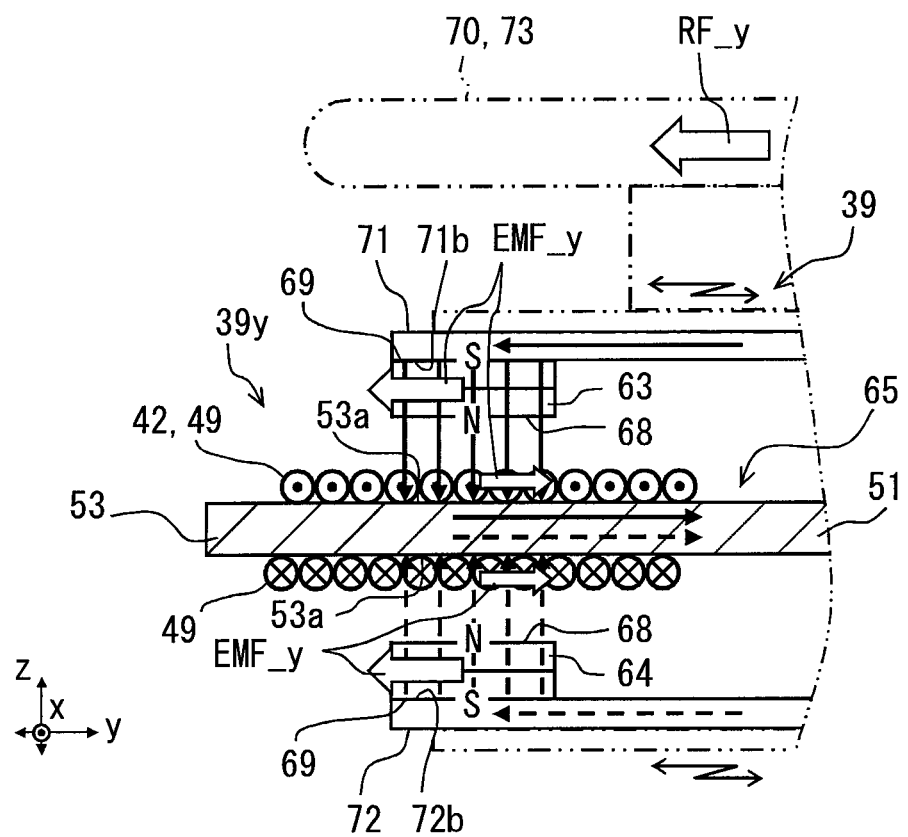
FIG. 8 is a sectional view taken along a line VIII-VIII of FIG. 6 to schematically illustrate magnetic fluxes flowing around the magnetic circuit.

Also, as shown in FIG. 8, magnetic fluxes generated by the respective magnets 63 and 64 pass through (penetrate through) the coiled wire 49 of the second coil 42 in the z-axis direction. Hence, when charges migrate inside the coiled wire 49 placed in a magnetic field due to application of a current to the second coil 42, a Lorentz force is developed in each charge. Accordingly, the second VCM 39y produces electromagnetic forces EMF_y in the y-axis direction (second direction) between the second coil 42 and the respective magnets 63 and 64. By inverting a direction of a current applied to the second coil 42, produced electromagnetic forces EMF_y are also inverted to an opposite direction along the y-axis.

The fixed yoke 51 shown in FIG. 3 through FIG. 6 is made of a magnetic material, for example, soft iron and a magnetic steel sheet. The fixed yoke 51 is provided with two coil-side yoke portions 52 and 53 and a coupling portion 54. The coil-side yoke portions 52 and 53 and the coupling portion 54 are formed in a flat plate shape.

One coil-side yoke portion (hereinafter, referred to as the first coil-side yoke portion) 52 is inserted in the storage chamber 41a of the first coil 41 and penetrates through the storage chamber 41a. First counter surfaces 52a are provided to both surfaces of the first coil-side yoke portion 52 stored in the storage chamber 41a. The two first counter surfaces 52a are disposed on an inner peripheral side of the first coil 41 and oppose the magnetized surfaces 68 of the respective magnets 61 and 62 disposed on an outer peripheral side of the first coil 41 in such a manner that the first counter surfaces 52a and the respective magnets 61 and 62 sandwich the first coil 41 from both inside and outside. Magnetic fluxes generated by the respective magnets 61 and 62 and led to the first coil-side yoke portion 52 pass through (penetrate through) the coiled wire 49 of the first coil 41 in the z-axis direction.

The other coil-side yoke portion (hereinafter, referred to as the second coil-side yoke portion) 53 is inserted in the storage chamber 42a of the second coil 42 and penetrates through the storage chamber 42a. Second counter surfaces 53a are provided to both surfaces of the second coil-side yoke portion 53 stored in the storage chamber 42a. The two second counter surfaces 53a are disposed on an inner peripheral side of the second coil 42 and oppose the magnetized surfaces 68 of the respective magnets 63 and 64 disposed on an outer peripheral side of the second coil 42 in such a manner that the second counter surfaces 53a and the respective magnets 63 and 64 sandwich the second coil 42 from both inside and outside. Magnetic fluxes generated by the respective magnets 63 and 64 and led to the second coil-side yoke portion 53 pass through (penetrate through) the coiled wire 49 of the second coil 42 in the z-axis direction.

Hence, the first coil-side yoke portion 52 of the fixed yoke 51 corresponds to the respective magnets 61 and 62 whereas the second coil-side yoke portion 53 corresponds to the respective magnets 63 and 64. The first coil-side yoke portion 52 and the second coil-side yoke portion 53 are provided in such a manner that regions corresponding to the respective magnets 61 and 62 are separated from regions corresponding to the respective magnets 63 and 64.

The coupling portion 54 is a portion which couples one end of the first coil-side yoke portion 52 in the x-axis direction and one end of the second coil-side yoke portion 53 in the x-axis direction on an outer side of the first coil 41 and the second coil 42.

The fixed yoke 51 extending from the storage chamber 41a of the first coil 41 to the storage chamber 42a of the second coil 42 is thus provided.

As with the fixed yoke 51, each of the movable yokes 71 and 72 is made of a magnetic material, such as soft iron and a magnetic steel sheet. Both of the movable yokes 71 and 72 are formed of an oblong flat plate member in substantially an identical shape. The movable yokes 71 and 72 are held by the knob base 74 at locations at which one opposes the other with the two coils 41 and 42 in between in the z-axis direction. The movable yokes 71 and 72 are provided with first holding surfaces 71a and 72a and second holding surfaces 71b and 72b, respectively. The movable yoke 71 holds the mounting surface 69 of the magnet 61 using the first holding surface 71a and holds the mounting surface 69 of the magnet 63 using the second holding surface 71b. The other movable yoke 72 holds the mounting surface 69 of the magnet 62 using the first holding surface 72a and holds the mounting surface 69 of the magnet 64 using the second holding surface 72b.

Hence, the fixed yoke 51 and the movable yoke 71 are disposed to sandwich the magnets 61 and 63. Likewise, the fixed yoke 51 and the movable yoke 72 are disposed to sandwich the magnets 62 and 64.

Figure 13:
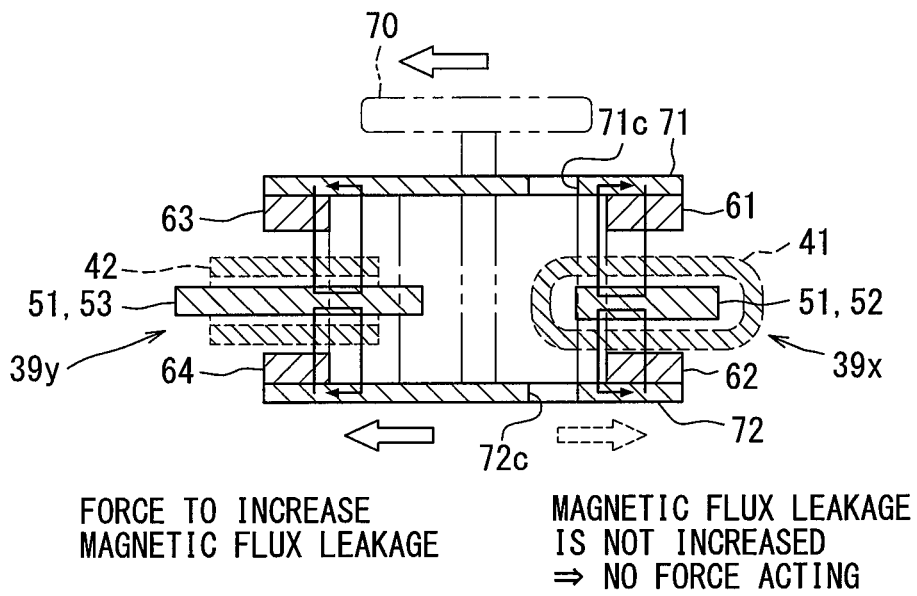
FIG. 13 is a view describing that a force increasing the magnetic flux leakage portion ceases to act due to a hole part.
Figure 14:
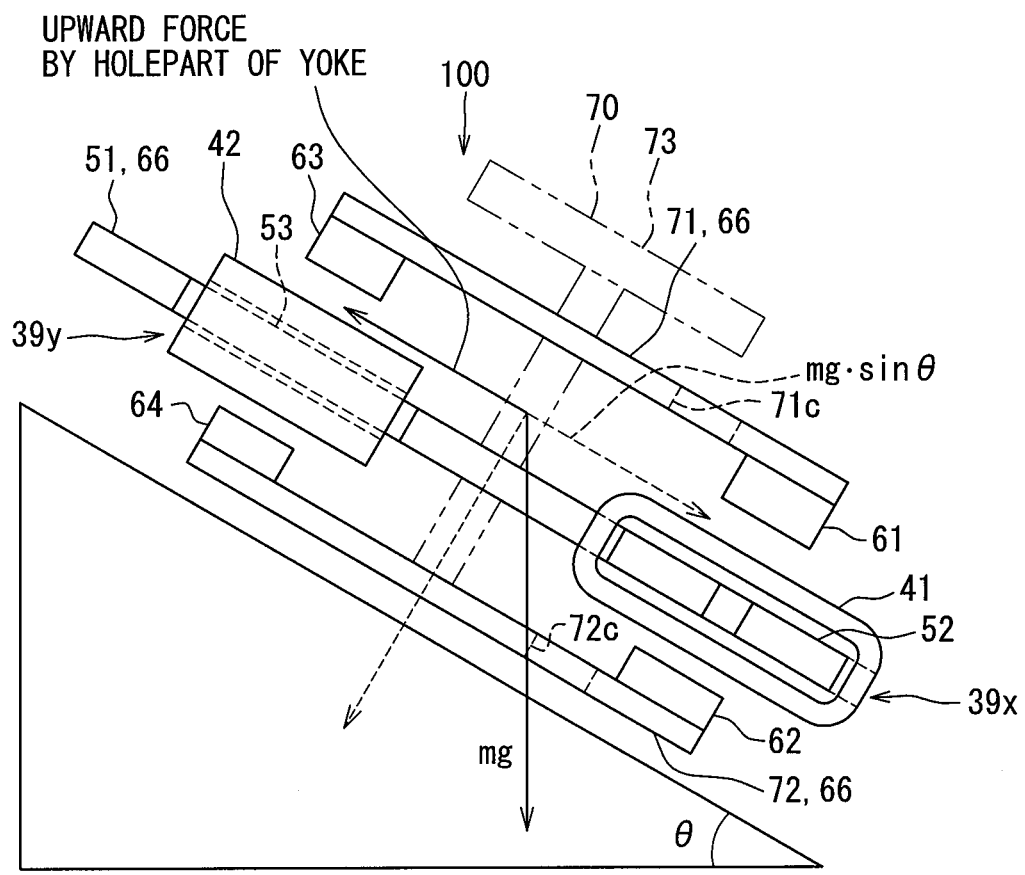
FIG. 14 is a view describing that a force due to own weight in inclined installation is restricted by an upward force generated by the hole part.

In the present embodiment, as shown in FIG. 13 and FIG. 14, the movable yoke 71, 72 has magnetic resistance as resistance in a magnetic circuit. The magnetic resistance is provided in such a manner that an acting force (stabilizing force) described below acts in a direction opposite to a fall direction under own weights of the movable yoke 71, 72 in inclined installation. More specifically, the magnetic resistance is provided to the movable yokes 71 and 72 within regions connecting the regions corresponding to the magnets 61 and 62 and the magnets 63 and 64, respectively, at locations next to the regions corresponding to the respective magnets 61 and 62 of the first VCM 39x on the lower side in the inclined installation. Herein, the magnetic resistance is provided in the form of hole parts 71c and 72c.

Figure 7:
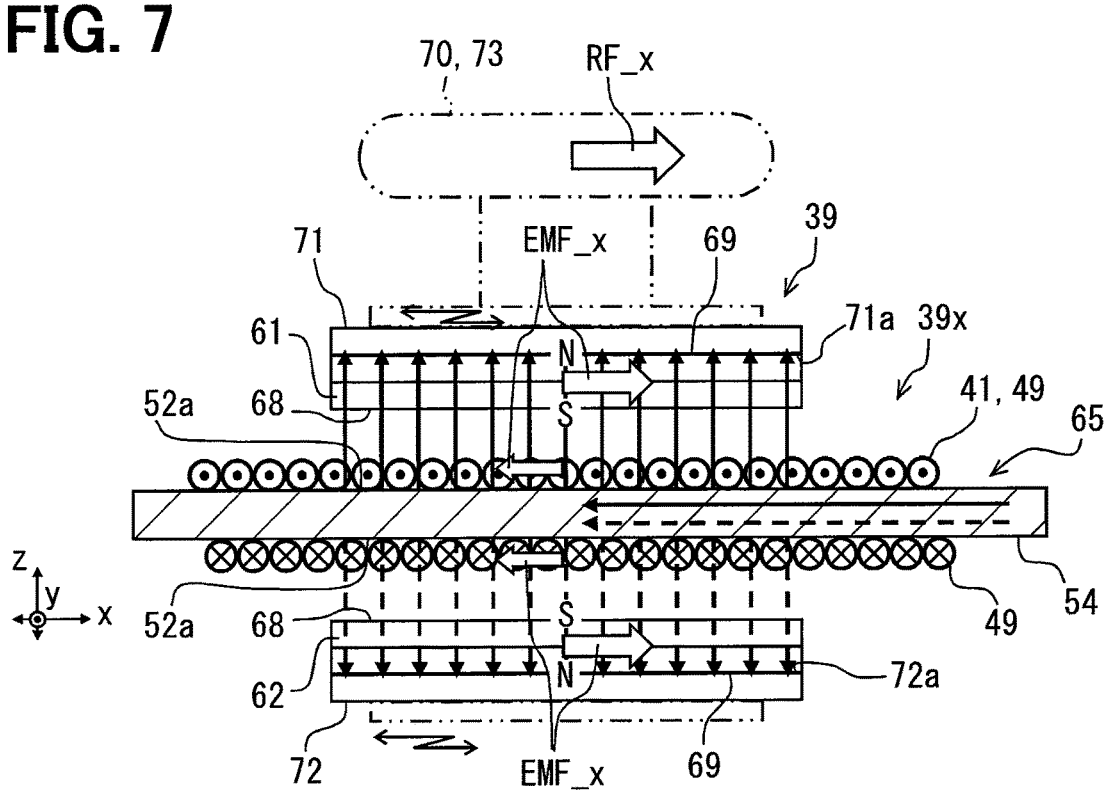
FIG. 7 is a sectional view taken along a line VII-VII of FIG. 6 to schematically illustrate magnetic fluxes flowing around a magnetic circuit.
Figure 9:
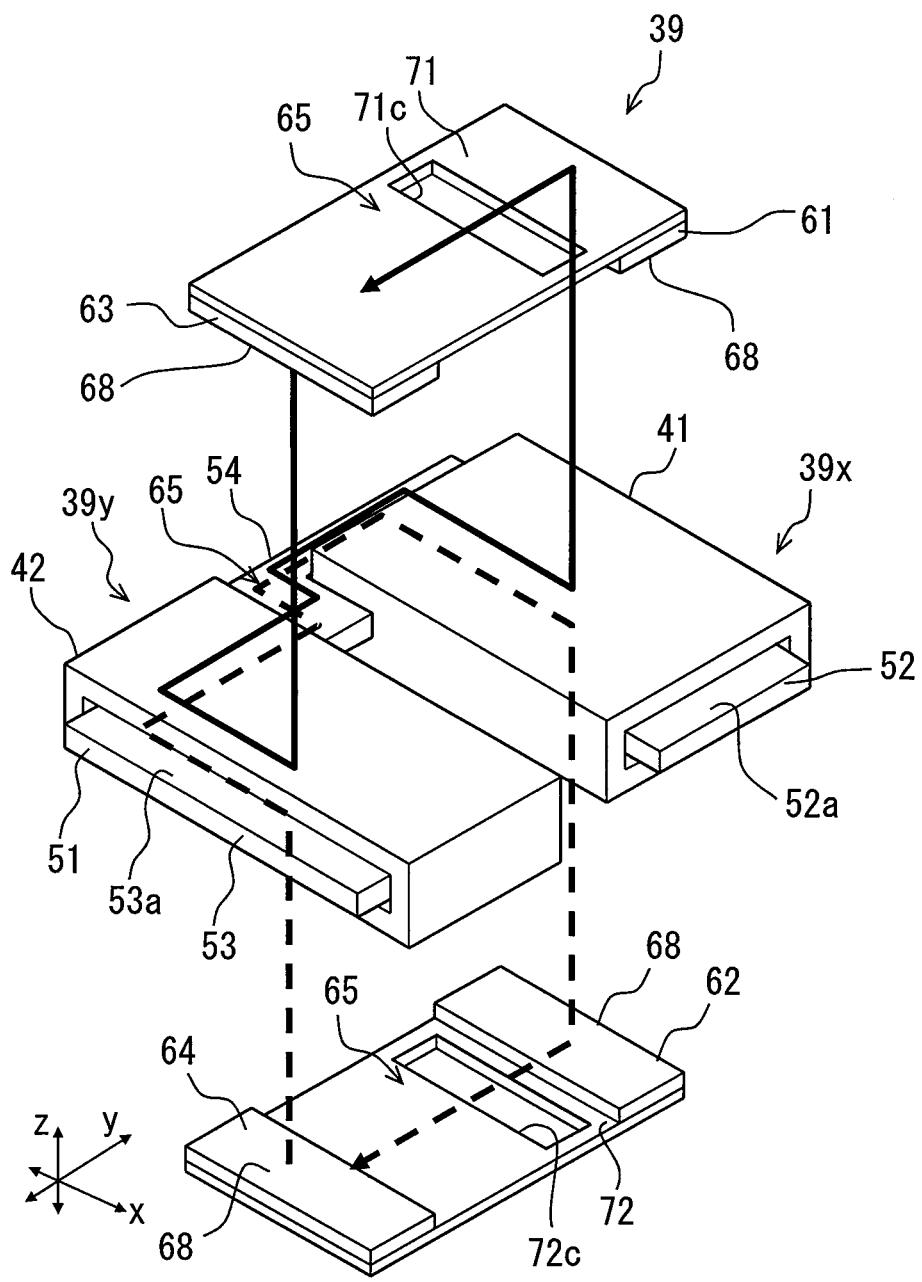
FIG. 9 is an exploded perspective view of the reaction force generator to schematically illustrate magnetic fluxes flowing around the magnetic circuit.

The fixed yoke 51, the two movable yokes 71 and 72, and so on described above form a magnetic circuit 65 of the reaction force generator 39 shown in FIG. 7 through FIG. 9 as a magnetic path forming body 66. In the magnetic circuit 65, magnetic fluxes flow around via the fixed yoke 51 and the respective movable yokes 71 and 72. Hence, magnetic fluxes generated by the respective magnets 61 and 62 of the first VCM 39x are led to the second VCM 39y and magnetic fluxes generated by the respective magnets 63 and 64 of the second VCM 39y are led to the first VCM 39x.

More specifically, in the respective magnets 61 and 62 of the first VCM 39x shown in FIG. 7 through FIG. 9, magnetic poles of the respective magnetized surfaces 68 facing the first coil 41 are same. Hence, directions of magnetic fluxes generated by the respective magnets 61 and 62 are opposite to each other along the z-axis direction. Magnetic fluxes heading for the respective first holding surfaces 71a and 72a from the corresponding first counter surface 52a are thus generated. The magnetic fluxes thus generated enter the movable yokes 71 and 72 from the first holding surfaces 71*a* and 72*a*, respectively. In the movable yokes 71 and 72, the magnetic fluxes head for the second holding surfaces 71*b* and 72*b* from the first holding surfaces 71*a* and 72*a*, respectively.

In the respective magnets 63 and 64 of the second VCM 39*y* shown in FIG. 8 and FIG. 9, magnetic poles of the respective magnetized surfaces 68 facing the second coil 42 are same and different from the magnetic poles of the two magnetized surfaces 68 opposing the first coil 41 (see also FIG. 7). Hence, directions of magnetic fluxes generated by the respective magnets 63 and 64 are opposite to each other along the z-axis direction. Magnetic fluxes heading for the respective second counter surface 53*a* from the corresponding second holding surfaces 71*b* and 72*b* are thus generated. The magnetic fluxes led by the respective movable yokes 71 and 72 in the manner as above enter the second coil-side yoke portion 53 from the respective second counter surfaces 53*a* and head for the first coil-side yoke portion 52 by passing through the coupling portion 54. The magnetic fluxes led into the fixed yoke 51 head again for the first holding surfaces 71*a* and 72*a* (see FIG. 7) from the corresponding first counter surfaces 52*a*.

In the manner as above, in the reaction force generator 39 shown in FIG. 7 through FIG. 9, magnetic fluxes generated by the respective magnets 61 and 62 of the first VCM 39*x* not only pass through the first coil 41 of the first VCM 39*x* but are also led by the magnetic circuit 65 and pass through the second coil 42 of the second VCM 39*y*. Likewise, magnetic fluxes generated by the respective magnets 63 and 64 of the second VCM 39*y* not only pass through the second coil 42 but are also led by the magnetic circuit 65 and pass through the first coil 41 of the first VCM 39*x*. Hence, density of magnetic fluxes between the respective first counter surfaces 52*a* and the corresponding first holding surfaces 71*a* and 72*a* and density of magnetic fluxes between the respective second counter surfaces 53*a* and the corresponding second holding surfaces 71*b* and 72*b* are both higher than in a configuration where a magnetic circuit is formed separately for the two VCMs 39*x* and 39*y*. Because density of magnetic fluxes penetrating through the coiled wire 49 of the first coil 41 in the z-axis direction increases, electromagnetic forces EMF_x that can be generated by the first VCM 39*x* increase. Likewise, because density of magnetic fluxes penetrating through the coiled wire 49 of the second coil 42 in the z-axis direction increases, electromagnetic forces EMF_y that can be generated by the second VCM 39*y* increase. Hence, operation reaction forces RF_x and RF_y acting on the operation knob 73 of the movable portion 70 and hence the operator can be increased while reducing an amount of materials used to form the respective magnets 61 through 64.

In addition, in the first VCM 39*x* of the first embodiment, the two magnets 61 and 62 oppose the corresponding first counter surfaces 52*a* in the z-axis direction while sandwiching the coiled wire 49 of the first coil 41 from both inside and outside. Hence, a magnetic attraction force with which the magnet 61 attracts the opposing first counter surface 52*a* can cancel out a magnetic attraction force with which the other magnet 62 attracts the opposing first counter surface 52*a*. Likewise, in the second VCM 39*y*, a magnetic attraction force with which the magnet 63 attracts the opposing second counter surface 53*a* can cancel out a magnetic attraction force with which the other magnet 64 attracts the opposing second counter surface 53*a*. When magnetic attraction forces acting on the movable portion 70 are reduced in the manner as above, the movable portion 70 can be moved smoothly upon input of an operation force by the operator.

An operation to restrict an influence of a downward force generated due to own weight when the operation input device 100 is installed with an inclination (FIG. 3) will now be described using FIG. 10 through FIG. 14.

When the operation input device 100 of the present embodiment is in an inclined posture, for example, as shown in FIG. 14, the first VCM 39*x* is on a lower side and the second VCM 39*y* is on an upper side at an inclined angle of θ. Let mg be own weight of the movable portion 70, then a force mg·sinθ is generated in the operation input device 100 installed in the manner as above as a downward force along a surface of the fixed yoke 51.

Figure 10:
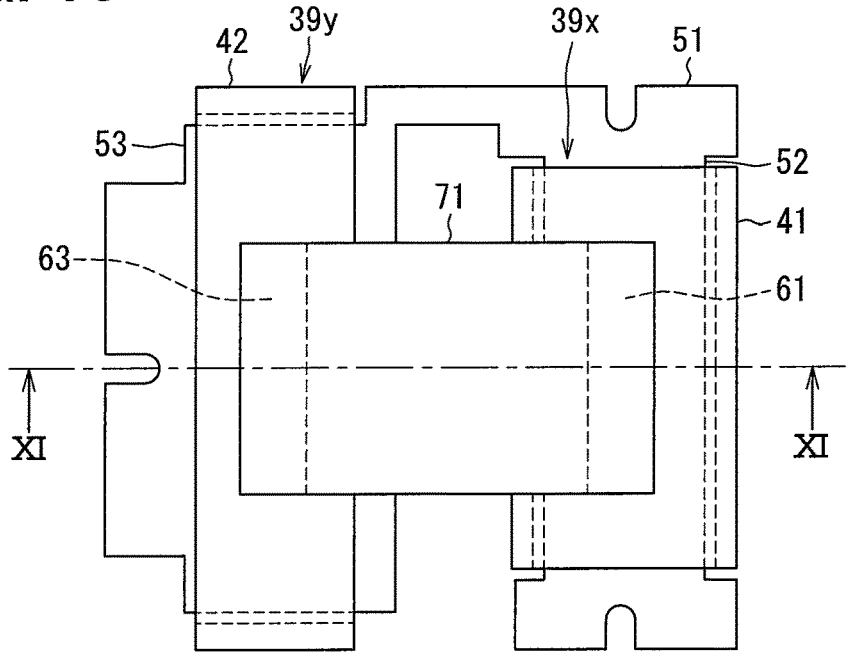
FIG. 10 is a top view of the reaction force generator.
Figure 11:
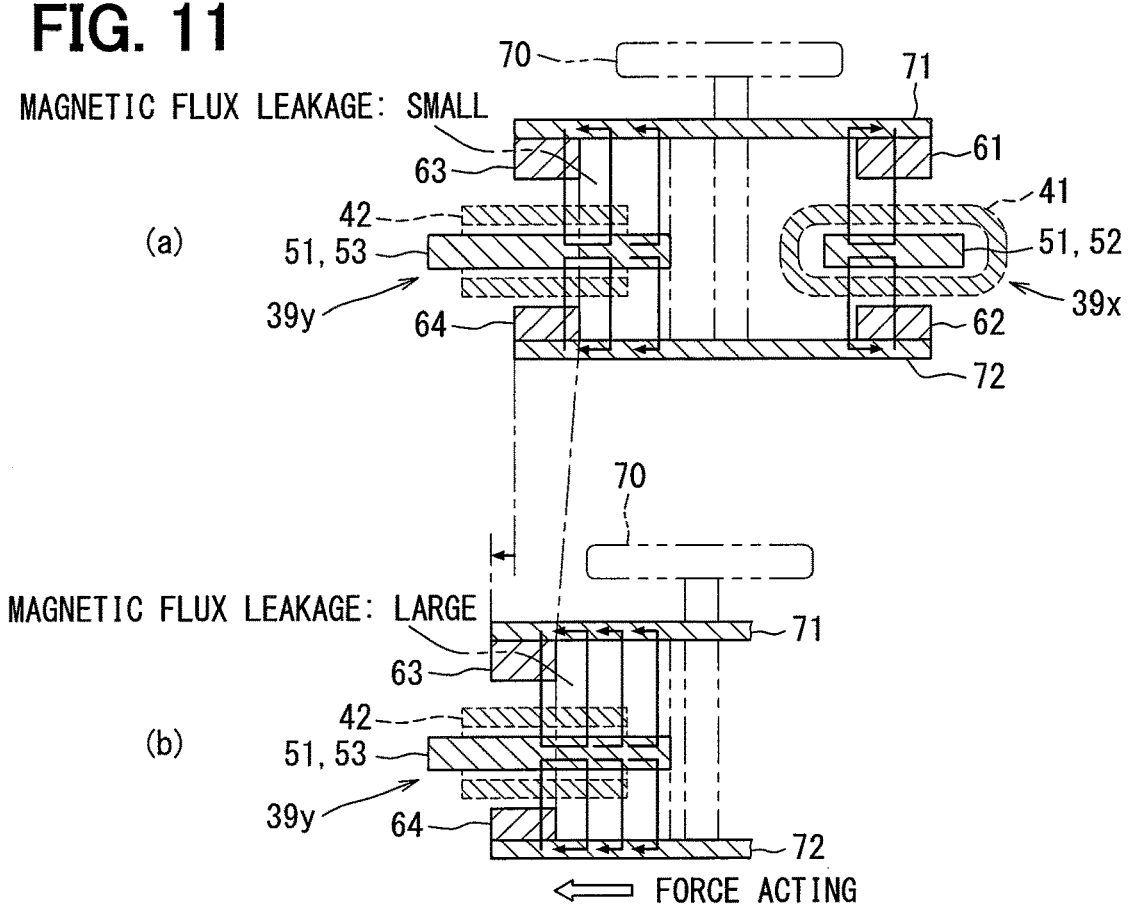
FIG. 11 is sectional views taken along a line XI-XI of FIG. 10 to describe generation of an acting force to increase a magnetic flux leakage portion.
Figure 12:
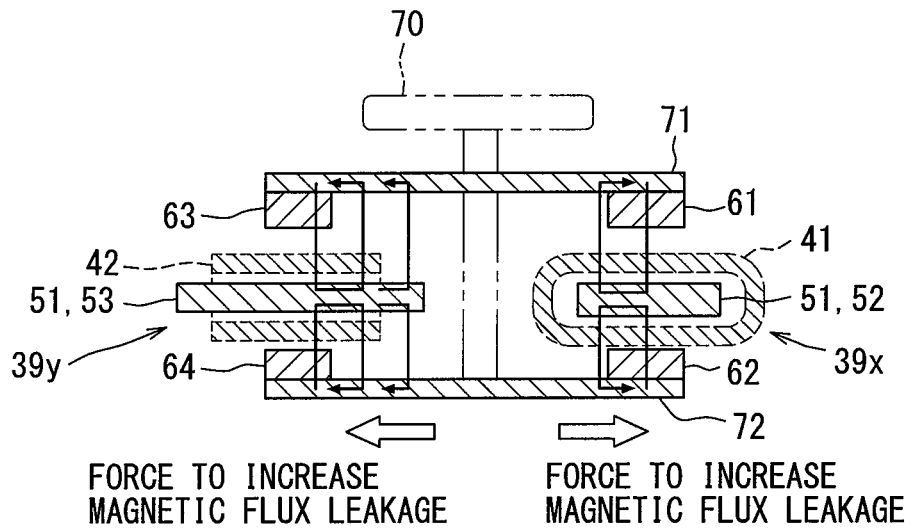
FIG. 12 is a view describing a state in which acting forces to increase the magnetic flux leakage portion are balanced out in the absence of magnetic resistance (hole part).

Firstly, a description will be given to a case as are shown in FIG. 10 through FIG. 12 where the movable yokes 71 and 72 are not provided with the hole parts 71*c* and 72*c*, respectively.

As shown in FIG. 11, the first coil-side yoke portion 52 and the movable yoke 71 form a magnetic circuit for a magnetic flux (magnetic flux leakage) generated by the magnet 61 and the first coil-side yoke portion 52 and the movable yoke 72 form a magnetic circuit for a magnetic flux (magnetic flux leakage) generated by the magnet 62. Likewise, the second coil-side yoke portion 53 and the movable yoke 71 form a magnetic circuit for a magnetic flux (magnetic flux leakage) generated by the magnet 63 and the second coil-side yoke portion 53 and the movable yoke 72 form a magnetic circuit for a magnetic flux (magnetic flux leakage) generated by the magnet 64.

Generally, forces act in the magnetic circuits formed as above in a direction to reduce resistance across a magnetic path about the magnets 61 and 63 via the fixed yoke 51 (the first coil-side yoke portion 52 and the second coil-side yoke portion 53) and the movable yoke 71 and resistance across a magnetic path about the magnets 62 and 64 via the fixed yoke 51 (the first coil-side yoke portion 52 and the second coil-side yoke portion 53) and the movable yoke 72. Resistance across a magnetic path decreases as an area of the magnetic path increases. Hence, an acting force is generated in a direction to increase an area of the magnetic path, that is, to increase magnetic flux leakage. FIG. 11 (*b*) shows an acting force generated on a side of the second coil 42.

In one of the fixed yoke 51 and the movable yokes 71 and 72, herein, in the fixed yoke 51, regions corresponding to the magnets 61 and 62 are separated from regions corresponding to the magnets 63 and 64. In other words, the fixed yoke 51 is separated to the first coil-side yoke portion 52 and the second coil-side yoke portion 53. In the other one of the fixed yoke 51 and the movable yokes 71 and 72, herein, in the movable yokes 71 and 72, regions corresponding to the magnets 61 and 62 are connected to regions corresponding to the magnets 63 and 64. In such a case, as shown in FIG. 12, an acting force on the side of the first coil 41 points oppositely to the second coil 42 and an acting force on the side of the second coil 42 points oppositely to the first coil 41. Hence, the two acting forces balance out and no apparent force is generated.

In contrast, in the present embodiment, as shown in FIG. 13 and FIG. 14, the other one of the fixed yoke 51 and the movable yokes 71 and 72, herein, the movable yokes 71 and 72 are provided with magnetic resistance as resistance in a magnetic circuit, that is, the hole parts 71*c* and 72*c*, respectively, at locations (upper side of inclination) next to regions corresponding to the respective magnets 61 and 62 of the first VCM 39*x* on the lower side in inclined installation.

The hole parts 71c and 72c limit an area forming a magnetic path in the respective magnets 61 and 62 of the first VCM 39x on the lower side to an extent not to allow a force such that increases magnetic flux leakage to act. On the contrary, an acting force pointing oppositely to the first coil 41 is generated on the side of the second coil 42 of the second VCM 39y on the upper side. Hence, an overall acting force is an upward force in inclined installation. That is, an overall acting force (upward force) corresponds to a stabilizing force of the present application. An upward force is a force opposite to a downward force (force in a fall direction under own weight) generated due to own weight in inclined installation. Hence, as is shown in FIG. 14, the upward force can counteract the downward force. Consequently, even when the operation input device 100 is installed with an inclination, an influence of a downward force due to own weight can be restricted.

An upward force can be a force that balances out with a downward force due to own weight by appropriately adjusting horizontal and vertical dimensions (dimensions in the x and y directions) of the hole parts 71c and 72c to suit magnitude of the downward force.

Figure 15:
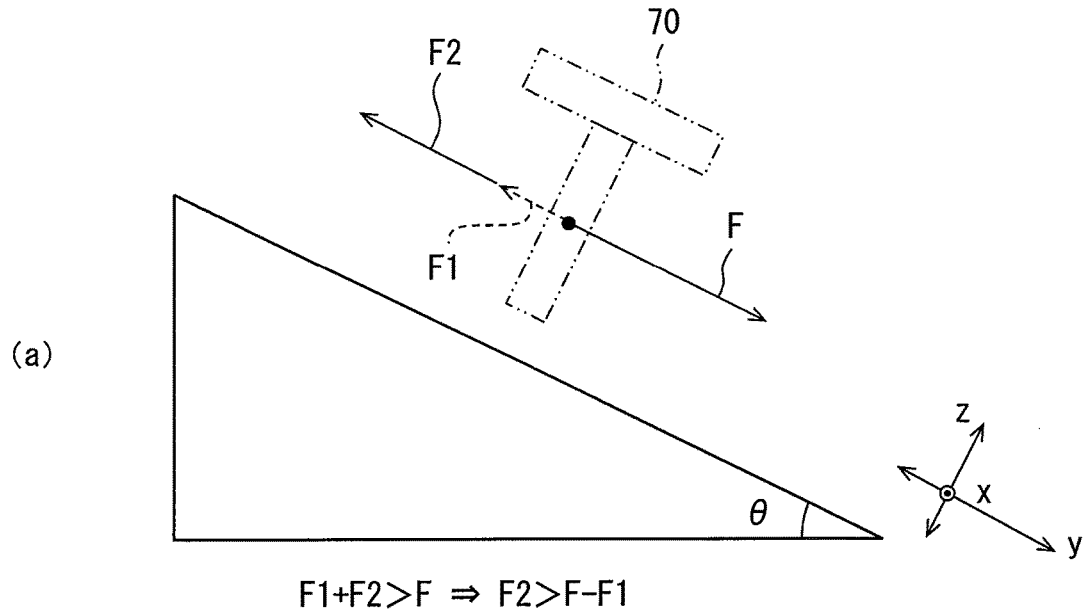
FIG. 15 is views used to describe a downward force, an upward force, and a frictional force.
Figure 15:
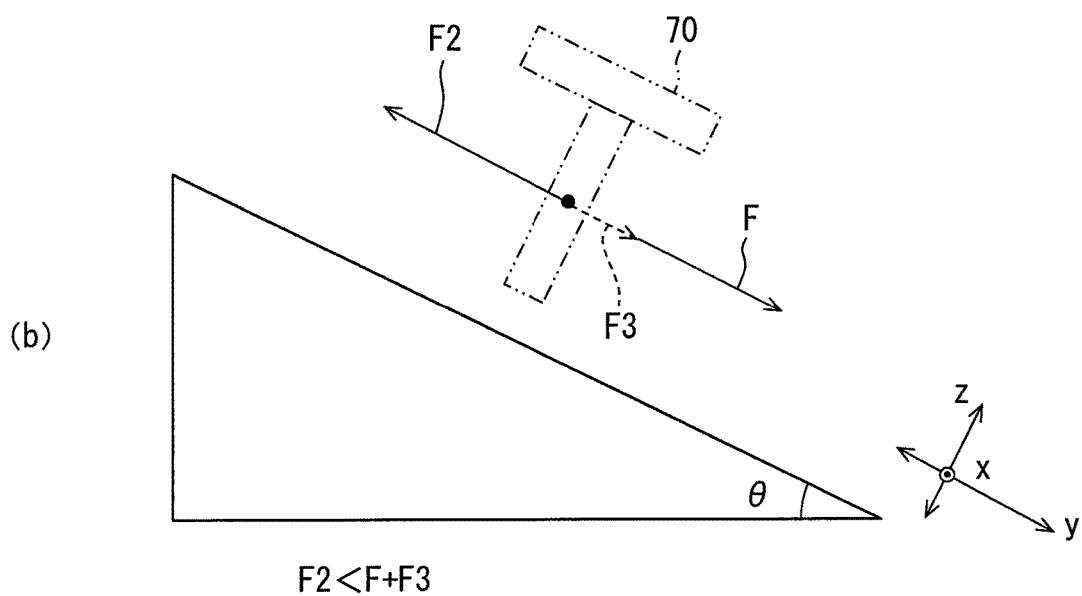
Figure 16:
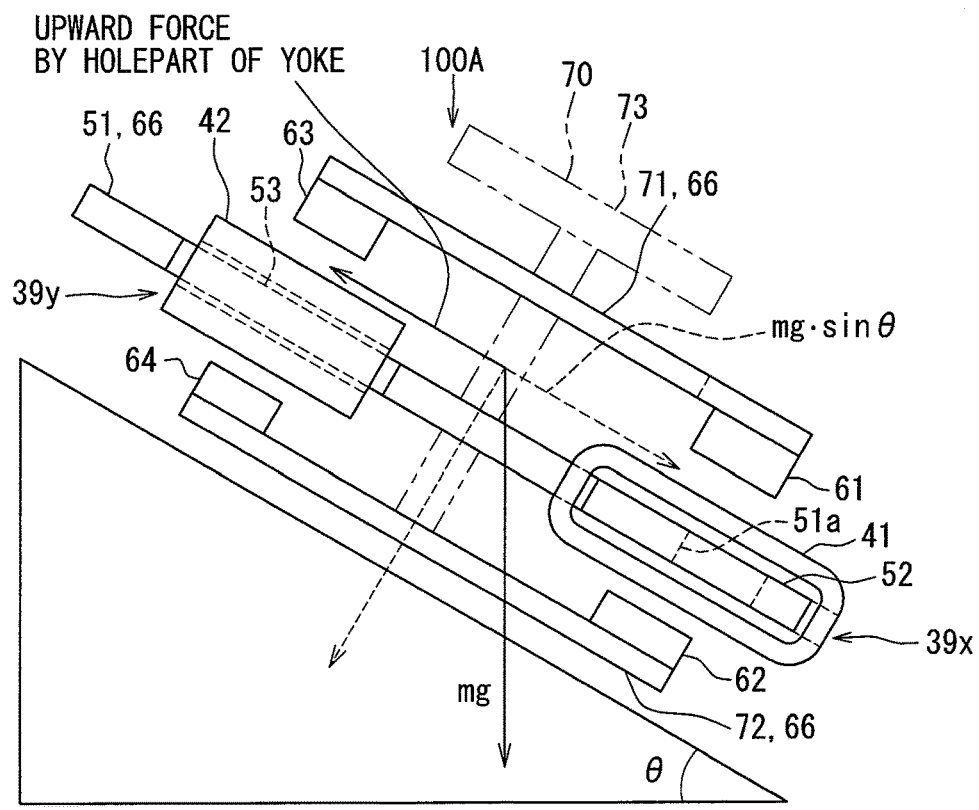
FIG. 16 is a side view of an operation input device according to a second embodiment.

In practice, as shown in FIG. 15 (a), a frictional force F1 in a direction (upward) opposite to a downward force F due to own weight acts on the movable portion 70. Hence, an influence of the downward force can be restricted by balancing out a total of an upward force F2 and the frictional force F1 (upward) with a downward force F due to own weight, which is expressed as: F1+F2>F and F2>F−F1.

A natural movement of the movable portion 70 due to the upward force F2 can be restricted by making the upward force F2 smaller than a total of a frictional force F3 (downward) against the upward force F2 and the downward force F as is shown in FIG. 15 (b), which is expressed as: F2<F+F3.

In the first embodiment, the operation input device 100 corresponds to "an input device", the first VCM 39x to "a first actuator, one of the actuators", and the second VCM 39y to "a second actuator, the other actuator". The fixed portion 50 corresponds to "a supporting portion" and the movable portion 70 to "an input portion". The fixed yoke 51 corresponds to "one of a fixed yoke and a movable yoke" and the movable yokes 71 and 72 to "the other one of the fixed yoke and the movable yoke". The magnets 61 and 62 correspond to "a first magnetic pole forming portion" and the magnets 63 and 64 to "a second magnetic pole forming portion".

Second Embodiment

An operation input device 100A of a second embodiment is shown in FIG. 16 through FIG. 20. The second embodiment is different from the first embodiment in that the magnetic resistance (hole parts 71c and 72c) is provided at a different position. In the second embodiment, magnetic resistance is provided in the form of a hole part 51a.

The hole part 51a is provided to one of a fixed yoke 51 and a movable yoke 71 (one position), herein, to the fixed yoke 51 (first coil-side yoke portion 52). The hole part 51a is disposed oppositely to magnets 61 and 62 of movable yokes 71 and 72, respectively, in such a manner that the hole part 51a overlaps the magnets 61 and 62 when viewed in a direction in which the fixed yoke 51 and the movable yokes 71 and 72 are overlaid one another (aligned side by side), that is, when viewed in a z-axis direction of FIG. 16. The hole part 51a is deviated from the magnets 61 and 62 to a lower side in inclined installation. A portion of the hole part 51a which does not overlap the magnets 61 and 62 is in a lower region in inclined installation.

Figure 17:
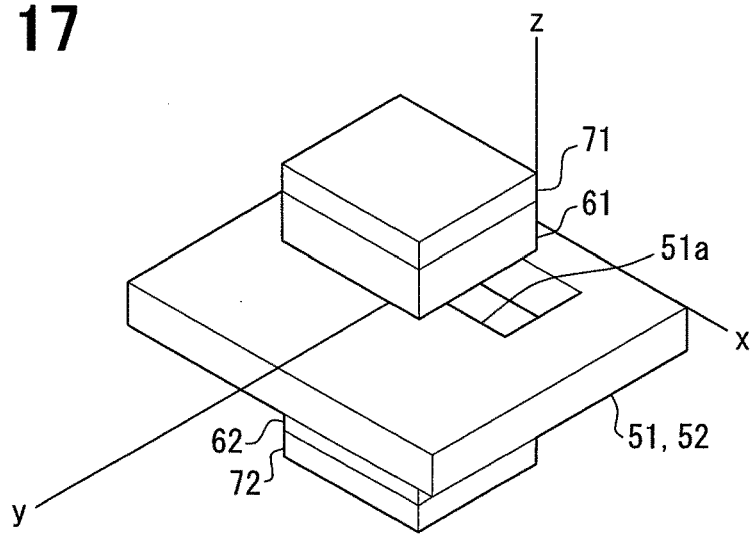
FIG. 17 is a perspective view illustrating a hole part provided to a fixed yoke.
Figure 18:
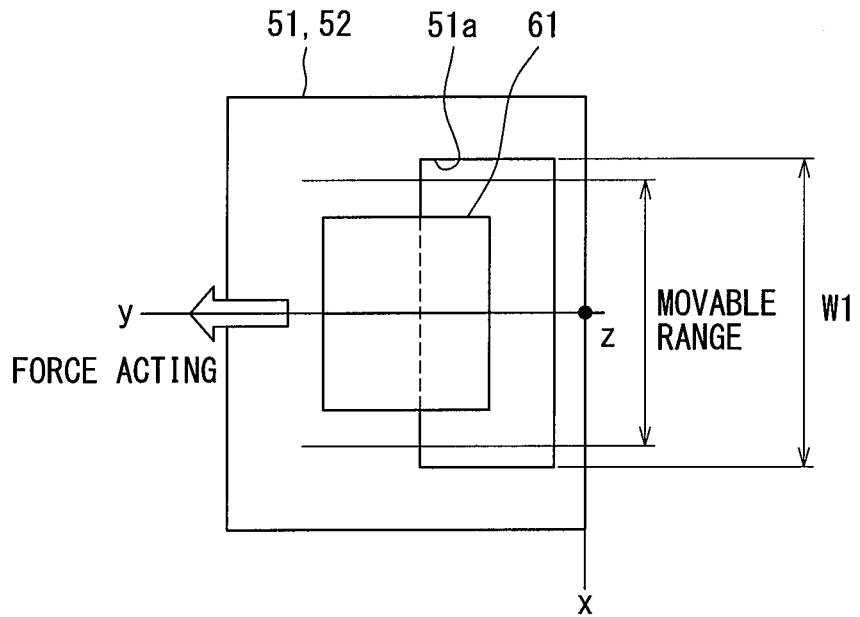
FIG. 18 is a top view illustrating a width dimension (W1) of the hole part.

As shown in FIG. 17 and FIG. 18, given that a direction intersecting with (orthogonal to) a fall direction under own weight (y-axis direction) in inclined installation on a plate surface of the fixed yoke 51, that is, an x-axis direction is a width direction of the hole part 51a, then a width dimension W1 of the hole part 51a is set to be larger than a movable range of the magnet 61(62) in the x-axis direction. Hence, no matter in what manner the magnet 61(62) is made movable in the x-axis direction, an overlapping area of the hole part 51a and the magnet 61(62) always remains constant.

Figure 19:
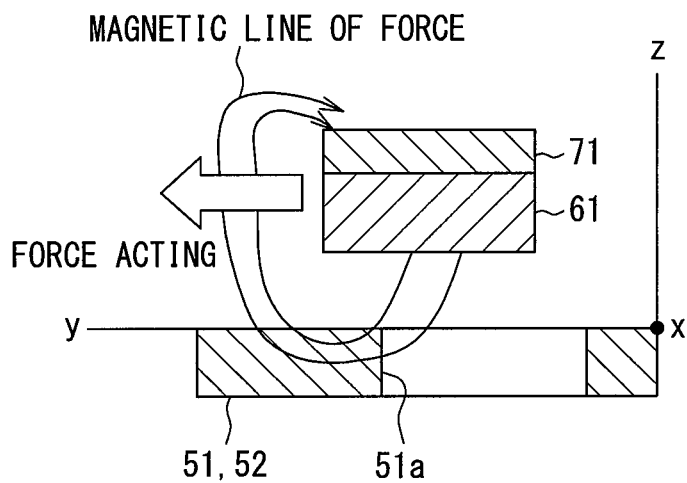
FIG. 19 is a view used to describe a state in which an acting force is generated.
Figure 20:
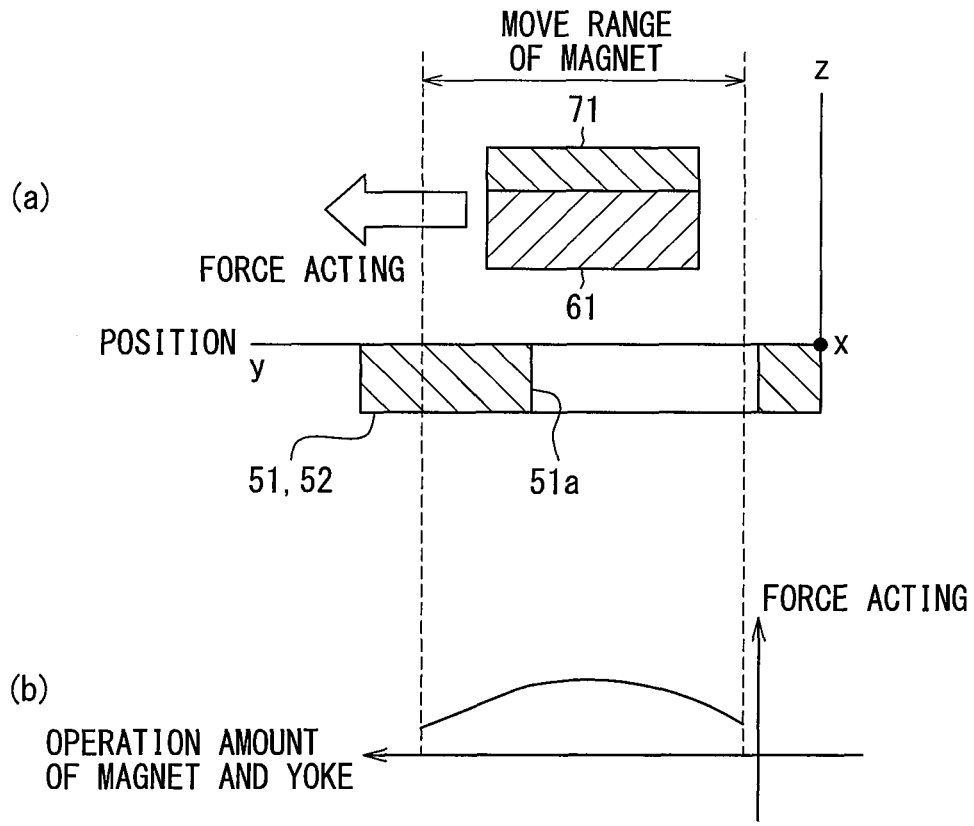
FIG. 20 is views used to describe a variance in acting force within a movable range of a magnet.

In the present embodiment, as is shown in FIG. 19, resistance across a magnetic path is increased by the hole part 51a. Hence, an acting force (stabilizing force) is generated in a direction to reduce resistance across the magnetic path, that is, as is indicated by a blank arrow of FIG. 19, in a direction to increase an area of the magnetic path. The acting force thus generated is an upward force in inclined installation. Hence, as with the first embodiment above, because an upward force can counteract a downward force generated due to own weight in inclined installation, even when the operation input device 100A is installed with an inclination, an influence of a downward force due to own weight can be restricted. As shown in FIG. 20, the acting force varies to take a maximal value at an arbitrary position within a movable range of the magnet 61(62) in the y-axis direction.

An overlapping area of the hole part 51a and the magnet 61(62) always remains constant even when the magnet 61(62) is made movable in the x-axis direction. Hence, a variation in the generated acting force can be smaller. That is to say, a degree with which to restrict a downward force in inclined installation can be stabilized.

In the present embodiment, the single hole part 51a is provided to the fixed yoke 51 as the magnetic resistance. In comparison with the first embodiment above in which the two hole parts 71c and 72c are provided to the movable yokes 71 and 72, respectively, man-hours required to provide a hole part can be reduced.

Third Embodiment

Figure 21:
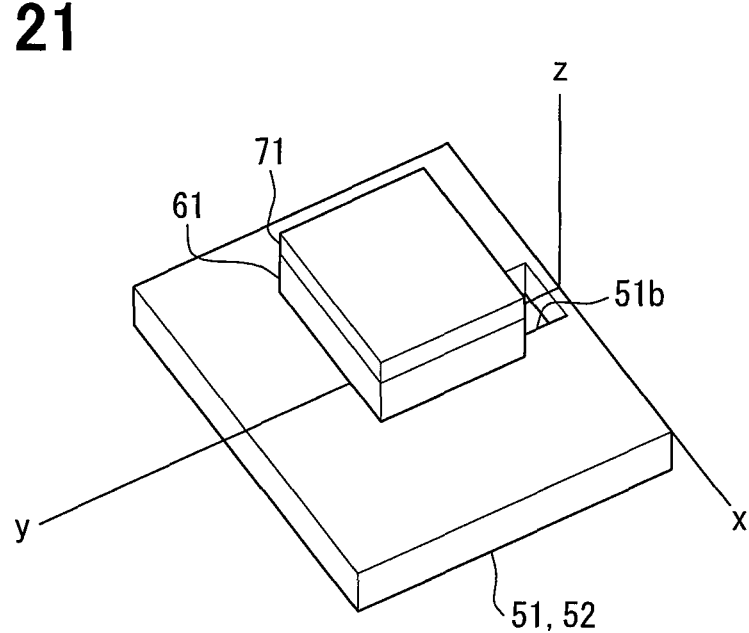
FIG. 21 is a perspective view of a hole part according to a third embodiment.
Figure 22:
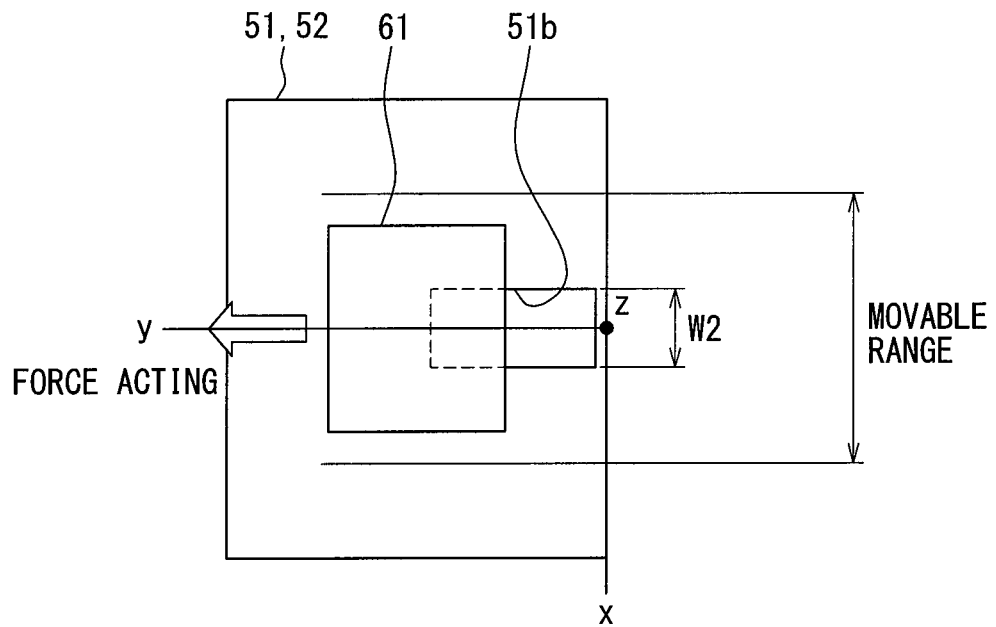
FIG. 22 is a top view illustrating a width dimension (W2) of a hole part.

Magnetic resistance of a third embodiment is shown in FIG. 21 and FIG. 22. In the third embodiment, a hole part 51b is provided instead of the magnetic resistance (hole part 51a) of the second embodiment above. The hole part 51b is different from the hole 51a in that the width dimension W1 is changed to a width dimension W2.

As shown in FIG. 22, the width dimension W2 of the hole part 51b is set within a range of a magnet 61(62) independently of a movable position of the magnet 61(62) in an x-axis direction. Hence, no matter in what manner the magnet 61(62) is made movable in the x-axis direction, an overlapping area of the hole part 51b and the magnet 61(62) always remains constant.

According to the present embodiment, an effect same as the effect achieved in the second embodiment above can be obtained by the hole part 51b.

Fourth Embodiment

Figure 23:
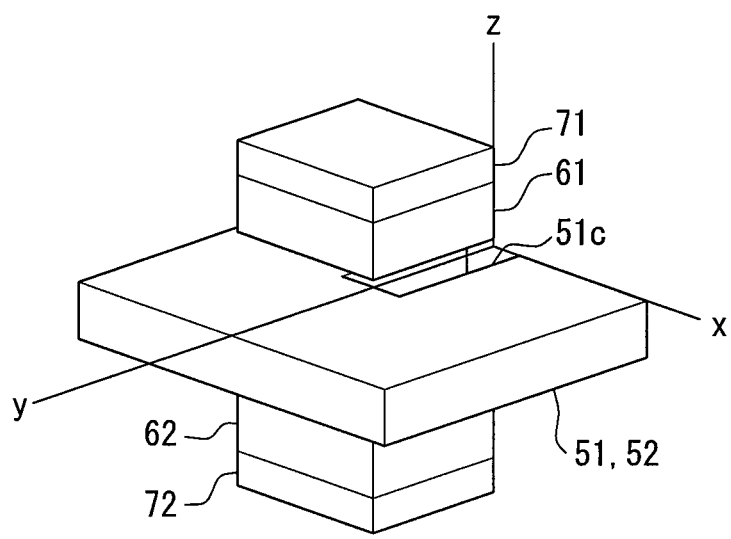
FIG. 23 is a perspective view of a hole part according to a fourth embodiment.
Figure 24:
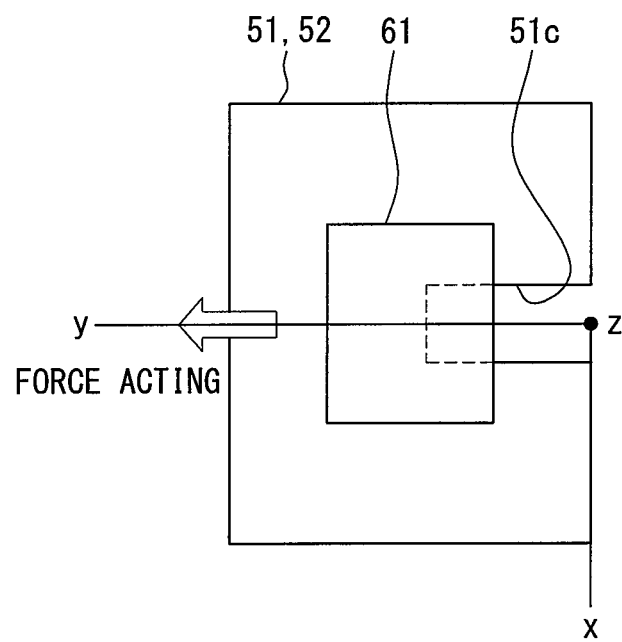
FIG. 24 is a top view illustrating an opening of the hole part.

Magnetic resistance of a fourth embodiment is shown in FIG. 23 and FIG. 24. In the fourth embodiment, a notch portion 51c is provided as the magnetic resistance. The notch portion 51c is different from the hole part 51b of the third embodiment above in that a periphery is opened partially at an end of the fixed yoke 51.

In comparison with cases where the magnetic resistance is provided to the fixed yoke 51 in the form of the hole part 51a or 51b, the fixed yoke 51 can be processed by merely making a cut in the fixed yoke 51 from the end. Hence, the notch portion 51c can be provided easily.

Other Embodiment

The magnetic resistance in the first embodiment above is in the form of the hole parts 71c and 72c provided to the movable yokes 71 and 72, respectively, and the magnetic resistance in the second through fourth embodiments above is in the form of the hole part 51a or 51b or the notch portion 51c provided to the fixed yoke 51. However, the present disclosure is not limited to the configurations as above. For example, the magnetic resistance may be provided in the form of a non-magnetic portion made of an impurity added to a material forming the movable yokes 71 and 72 or the fixed yoke 51, for example, by means of heating. The impurity can be, for example, carbons.

In the respective embodiments above, the movable yoke 71 (the magnets 61 and 63) and the movable yoke 72 (the magnets 62 and 64) are provided to sandwich the fixed yoke 51 in the z-axis direction. However, one of the movable yokes together with the respective magnets fixed to the movable yokes may be omitted. In such a case, an effect of cancelling out a magnetic attraction force between the opposing magnets 61 and 62 and a magnetic attraction force between the opposing magnets 63 and 64 cannot be obtained. Nevertheless, an influence of a downward force due to own weight in inclined installation can be restricted as in the respective embodiments above.

The respective embodiments above may be modified in such a manner that the fixed yoke 51 is replaced with a movable yoke and all the magnets 61 through 64 are provided to the newly provided movable yoke while the opposing movable yokes 71 and 72 are replaced with fixed yokes. In such a case, an effect same as the effect achieved in the first embodiment above can be obtained by providing magnetic resistance to the newly provided movable yoke. Also, effects same as the effects achieved in the respective second through fourth embodiments above can be obtained by providing magnetic resistance to the newly provided fixed yokes.

The first embodiment above may be modified in such a manner that the fixed yoke 51 is replaced with a movable yoke and the opposing movable yokes 71 and 72 are replaced with fixed yokes. In such a case, an effect same as the effect achieved in the first embodiment above can be obtained by providing magnetic resistance to the newly provided fixed yokes. Also, effects same as the effects achieved in the respective second through fourth embodiments above can be obtained by providing magnetic resistance to the newly provided movable yoke.

The respective embodiments may be modified in such a manner that the magnets 61 through 64 are stored in the storage chambers 41a and 42a of the coils 41 and 42, respectively, and fixed to the corresponding counter surfaces 52a and 53a of the fixed yoke 51. In such a case, an effect same as the effect achieved in the first embodiment above can be obtained by providing magnetic resistance to the fixed yoke. Also, effects same as the effects achieved in the respective second through fourth embodiments above can be obtained by providing magnetic resistance to the movable yokes.

The respective embodiments above may be modified in such a manner that the display system 10 includes a head-up display device 120 (see FIG. 2) instead of or in addition to the navigation device 20. The head-up display device 120 is stored in the instrument panel of the vehicle in front of the driver's seat and shows an image virtually by projecting the image to a projection region 122 defined within a windshield. The operator seated in the driver's seat becomes able to visually confirm multiple icons correlated with preliminarily assigned functions and a pointer 80 and so on used to select a desired icon through the projection region 122. As with the pointer 80 displayed on the display screen 22, the pointer 80 can be moved across the projection region 122 in a direction corresponding to an input direction of an operation force by an input of an operation in a horizontal direction into the operation knob 73.

The respective embodiments above have described the operation input device set in the center console as a remote-control device to operate the navigation device or the like. It should be appreciated, however, that the input device of the present disclosure is also applicable to a selector, such as a shift lever provided to the center console, a steering switch provided to a steering wheel, and so on. The input device of the present disclosure is also applicable to an instrument panel, an arm rest provided to a door or the like, and various devices provided near back seats or the like to operate functions furnished to the vehicle. Applications of the operation input device of the present disclosure are not limited to vehicular devices and the operation input device of the present disclosure can be also adopted as a general operation system used in various transportation devices and various information terminals.

What is claimed is:

1. An input device comprising:
an input portion in which an operation force is inputted in a direction parallel to a virtual operation plane;
a supporting portion supporting the input portion in a movable manner along the operation plane in response to an input of the operation force;
a first actuator having a first magnetic pole forming portion forming a magnetic pole and a first coil through which a magnetic flux generated by the first magnetic pole forming portion passes, and letting an electromagnetic force generated by application of a current to the first coil act on the input portion as an operation reaction force in a first direction parallel to the operation plane;
a second actuator having a second magnetic pole forming portion forming a magnetic pole and a second coil through which a magnetic flux generated by the second magnetic pole forming portion passes, and letting an electromagnetic force generated by application of a current to the second coil act on the input portion as an operation reaction force in a second direction parallel to the operation plane and intersecting with the first direction; and
a fixed yoke and a movable yoke disposed to sandwich the first magnetic pole forming portion and the second magnetic pole forming portion and forming a magnetic circuit for magnetic fluxes generated by the first and second magnetic pole forming portions, wherein:
the first and second actuators are arranged in an inclined installation, in which one of the first and second actuators is located on a lower side of the other;
one of the fixed yoke and the movable yoke has a magnetic resistance as resistance in the magnetic circuit;
a stabilizing force is generated in the movable yoke to stabilize the magnetic circuit against the magnetic resistance; and
the magnetic resistance is located such that an acting direction of the stabilizing force is opposite to a fall direction of the movable yoke based on own weight in accordance with the inclined installation.

2. The input device according to claim 1, wherein:
in one of the fixed yoke and the movable yoke, regions corresponding to the first magnetic pole forming portion and the second magnetic pole forming portion are separated from each other;
in the other of the fixed yoke and the movable yoke, regions corresponding to the first magnetic pole forming portion and the second magnetic pole forming portion are connected with each other; and
the magnetic resistance is located in a connecting region in the other one of the fixed yoke and the movable yoke at a location adjacent to a region corresponding to the magnetic pole forming portion in the one of the first and second actuators disposed on the lower side.

3. The input device according to claim 2, wherein:
the magnetic resistance is a hole part defined in the movable yoke.

4. The input device according to claim 2, wherein:
the magnetic resistance is a non-magnetic portion made of an impurity added to the movable yoke.

5. The input device according to claim 1, wherein:
the magnetic resistance is defined in one of the fixed yoke and the movable yoke;
the first magnetic pole forming portion and the second magnetic pole forming portion are defined in the other of the fixed yoke and the movable yoke; and
the magnetic resistance is located to oppose the first magnetic forming portion and overlap partially the first magnetic pole forming portion when viewed in a direction in which the fixed yoke and the movable yoke are aligned side by side.

6. The input device according to claim 5, wherein:
the magnetic resistance is a hole part defined in the fixed yoke.

7. The input device according to claim 6, wherein:
the first magnetic pole forming portion is defined in the movable yoke;
a direction intersecting with the fall direction based on own weight on a surface of the fixed yoke is defined as a width direction; and
a dimension of the hole part in the width direction is set to be larger than a movable range in the width direction of the first magnetic pole forming portion which moves with the movable yoke.

8. The input device according to claim 6, wherein:
the first magnetic pole forming portion is defined in the movable yoke;
a direction intersecting with the fall direction based on own weight on a surface of the fixed yoke is defined as a width direction; and
a dimension of the hole part in the width direction is set to a range within the first magnetic pole forming portion independently of a movable position in the width direction of the first magnetic pole forming portion which moves with the movable yoke.

9. The input device according to claim 6, wherein:
the hole part is partially opened at an end of the fixed yoke.

* * * * *